United States Patent [19]

Justice

[11] 3,849,594

[45] Nov. 19, 1974

[54] MULTI-PICTURE TV SYSTEM WITH AUDIO AND DODING CHANNELS

[75] Inventor: James W. H. Justice, Murrysville, Pa.

[73] Assignee: Westinghouse Electric Corporation, Pittsburgh, Pa.

[22] Filed: May 25, 1973

[21] Appl. No.: 364,166

[52] U.S. Cl. .......................... 178/5.6, 178/DIG. 23

[51] Int. Cl. ............................................ H04n 7/04

[58] Field of Search ........... 178/5.6, DIG. 23, 5.2 R, 178/5.8 A, 5.8 R, 6.8, 7.7; 179/15 BM

[56] References Cited

UNITED STATES PATENTS

| | | | |
|---|---|---|---|
| 2,875,271 | 2/1959 | Moore et al. | 178/5.2 |
| 3,180,931 | 4/1965 | Morchand | 178/5.6 |
| 3,256,386 | 6/1966 | Morchand | 178/DIG. 23 |

FOREIGN PATENTS OR APPLICATIONS

| | | | |
|---|---|---|---|
| 755,824 | 8/1956 | Great Britain | 178/DIG. 23 |

*Primary Examiner*—Robert L. Richardson
*Assistant Examiner*—R. John Godfrey
*Attorney, Agent, or Firm*—M. P. Lynch

[57] ABSTRACT

A TV broadcast system features the transmission of a plurality of separate pictures and a plurality of audio signals on a single television carrier signal such that two different pictures may be selectively displayed in at least two of four quadrants defined on the screen of a television receiving tube. In a first embodiment, eight TV cameras have their video output signals connected to separate quadrant blankers from where the signals are summed to form two composite video signals each providing a picture for the four quadrants of the TV picture tube. The composite signals are then connected to the Y and I inputs of an encoder. The Q input of the encoder receives a composite signal in the form of eight audio signals and two coding signals.

In a second embodiment two color cameras and four monochrome cameras each has their video output signals connected to separate blankers from where the signals are delivered to summation circuits to provide three composite video signals. The color cameras are associated with one summation circuit and pairs of the monochrome cameras are associated with each of two other summation circuits. The color composite signal after matrixing is added to one of the monochrome composite signals and then connected to the Y, I and Q inputs to an encoder. The Q channel, used only for the transmission of color programming, is time-shared during the remaining portion of the time for the transmission of a plurality of audio signals.

15 Claims, 6 Drawing Figures

Fig. I

MULTI-PICTURE TV SYSTEM WITH AUDIO AND DODING CHANNELS

BACKGROUND OF THE INVENTION

Systems, such as those shown in Morchand U.S. Pat. Nos. 3,180,931 and 3,256,386 have been provided for simultaneously transmitting over a single television channel carrier frequency, a plurality of pictures which are normally displayed in the four quadrants of a television receiving tube. In these systems, one or more quadrants can be blanked out by switches at the receiver so that the viewer sees only a selected one or more of the quadrants. An arrangement of this sort is particularly adapted for use in educational television systems. Thus, the instructor at the transmitting station may cause different scenes or written material to appear at the four quadrants of a remote receiving tube as viewed by the student. He could then pose a problem via the audio channel of the television system and ask which one of the four quadrants contains the correct answer, for example, in a multiple choice answer to the question.

In systems of this type, while usable, they are not altogether satisfactory for the reason that the information ultimately studied by the student is limited to that which is displayed in the four quadrants of the picture tube along with the conventional FM audio channel. This is seen to provide a severe limitation upon the capabilities of such systems. Moreover, the student may experience severe difficulty in reading the written material or even viewing the scene which is displayed in only one quadrant of the picture tube.

To some extent, these shortcomings of this prior art have been overcome in the field of educational television by the systems disclosed in copending application Ser. Nos. 364,165, 364,163, 364,164 and 364,161, filed concurrently herewith and assigned to the Assignee of the present application.

In application Ser. No. 364,165, there is disclosed an educational television system wherein video signals for one color program could be transmitted in a conventional manner or the system could transmit concurrently three independent monochrome pictures. Three monochrome camera output signals are connected separately to the Y, I and Q inputs of a modified encoder which produce a modulated radio-frequency subcarrier signal having the characteristics of a standard color TV signal. This system had the distinct advantage of overcoming the objectionable practice of occupying a number of different radio-frequency channels wherein one channel was required for each program source. This system also eliminated the endless switching from channel to channel to avoid successive wear and premature failure of conventional tuner assemblies.

In application Ser. No. 364,161, there is provided an educational television system for transmitting and receiving on a single television carrier signal, four different pictures which are displayed one in each quadrant of a television receiving tube. This system included blanking circuitry operative to eliminate video signals from all but one quadrant that would correspond to the programming for one television camera. The system was applied to each of four television cameras so that the four quadrants could be occupied with programming material to fill the entire raster of the television tube. In addition, the receiver included circuitry for selecting the programming material in one quadrant and then centering and expanding the selected picture so as to occupy the entire raster of the tube.

In application Ser. No. 364,163, a transmission system is described for audio and coding channels in an educational television system. This system involves the use of blanked guard-band interval in the video signal during which audio or coding signals were inserted. The audio signals are used in pairs to amplitude and phase modulate the 3.5 megahertz subcarrier in the same way as the I and Q signals do in conventional color encoders. This was accomplished by using two 3.6 megahertz subcarriers which have a quadrature phase relationship to each other and amplitude modulating each of them with an audio signal. The resulting amplitude modulate subcarriers are then added together to produce an amplitude and phase modulated signal which is then inserted during a blanked guard-band interval. By repeating this process with another pair of audio signals, two bursts or pulses of modulated subcarriers are produced. The bursts are such that they can be separated and then synchronously detected at the receiver to produce four separate audio signals.

In application Ser. No. 364,164, there is disclosed an educational TV branching system wherein twelve separate pictures and twelve audio channels are transmitted on a single television carrier signal such that one of three different pictures appear in each quadrant of the television receiving tube. In this system, twelve TV cameras have their video output signals arranged in four groups of three signals. A blanker for each group blanks out all but one quadrant so that the three video signals are provided for this quadrant. Blankers for the other groups of video signals operate in a similar manner with respect to the remaining three quadrants. By adding together one video signal from each group there results three composite signals. Each composite signal represents an assembly of four pictures each occupying one quadrant of the TV raster. The composite signals are connected to the Y, I and Q inputs of the modified encoder for transmission on a single TV carrier signal. Twelve audio channels in this system are arranged in two groups of six audio signals. One group of six signals is inserted in a video signal line during a blanked guard-band interval as three bursts of amplitude and phase modulated subcarriers. A blanked guard-band interval is provided in the next video line for transmission of the other set of six audio signals in a similar manner.

In these foregoing systems, the need for audio and coding channels has a complicating effect on these systems. moreover, the use of the Q channel input to the encoder for the transmission of monochrome pictures is less than totally desirable since due to the low bandwidth of this channel, i.e., up to approximately 0.5 megahertz, the pictures transmitted thereby will be of an inferior quality to that transmitted by the Y and I channels. Moreover, in many instances, it is desirable to transmit color pictures in the field of educational television while at the same time providing other pictures in monochrome. In this regard, it is particularly meaningful in certain fields of education that the pictures viewed by the student depict or otherwise illustrate the colors of the scene. The quality of the audio transmission in many of the foregoing systems severely handicaps such systems because they do not provide a suitably wide bandwidth for audio signals.

A system may be most advantageously provided wherein only the Y and I input of an encoder are used for transmitting video signals and the Q channel is used for transmitting audio signals in either a time shared manner in instances of color transmission for two quadrants or in a manner solely using the Q channel for the audio signals when only quadrant monochrome pictures are transmitted.

SUMMARY OF THE INVENTION

The present invention provides a television transmission system wherein composite video signals corresponding to at least one picture for each of the quadrants in the field of a television receiving tube. These composite video signals are formed by blanker and summation means from where these signals are connected to the Y and I inputs to an encoder. The Q input to the encoder is employed for the transmission of a plurality of high quality audio signals along with coding signals if desired. In one form of the present invention, eight monochrome cameras provide a similar number of video signals for transmission using the Y and I input of an encoder with the Q input used for transmitting a plurality of audio signals and in a second form of the invention, six cameras, consisting of two color and four monochrome, provide video signals which are transmitted using the Y, I and Q inputs with the Q input being used in a time sharing manner for audio and color video signals.

Specifically, the present invention provides a television system for transmitting a plurality of separate pictures and a plurality of audio signals on a single television carrier comprising the combination of means for producing two composite video signals wherein each composite signal is formed by blankers for each of four video signals that limit the video signals for display in one quadrant in a manner such that the summation of the blank signals produces four scenes for display in the quadrants of a receiving tube, encoder means for receiving said composite signals and modulating one of them onto a subcarrier for transmission with the other signal on a single television carrier frequency and a plurality of audio signal gates each receiving an audio signal, control means for the gates, and adding means receiving the audio signals from the gates for delivery to the encoder means wherein modulation of the audio signals onto a subcarrier occurs in a quadrature phase relation with the modulated video signal and transmitted therewith on a single television carrier frequency.

According to a second form of the present invention, there is provided three groups of video signals each including two video signals with one group representing color pictures, and the other group representing monochrome pictures, means for blanking each of the video signals whereby each signal is limited for display in one of the quadrants of a television receiving tube, adding means forming three groups of composite signals such that one of the groups consists of the blanked video signals from the color television cameras, matrixing means for receiving the composite signal from the color television cameras and producing a Y, I and Q composite blanked signal, means for adding the composite signal from two of the monochrome cameras with the y signal component from the matrixing means, means for adding the composite signal from the two remaining monochrome cameras with the I signal component from the matrixing means, means for sampling a plurality of audio signals, means for forming a summation signal from the sampled audio signals, and means for adding the audio summation signal to the Q signal from the matrixing means for modulation onto a subcarrier in a quadrature phase with the subcarrier for the I signal.

These features and advantages of the present invention as well as others will be more fully understood when the following description is read in light of the accompanying drawings, in which.

Figure 1:
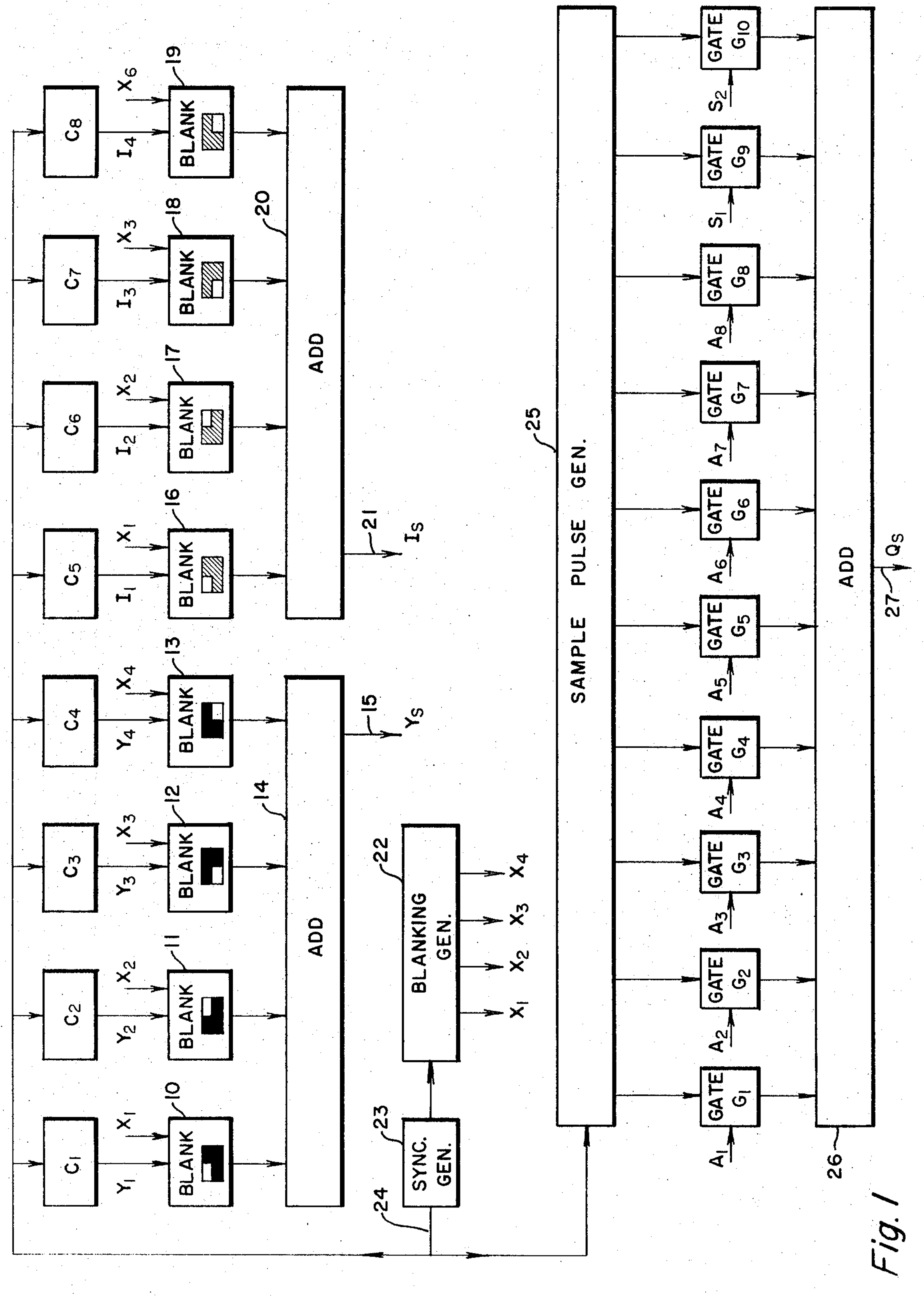
FIG. 1 is a block diagram of a television transmitter for transmitting eight video signals and a plurality of audio signals using a single television carrier frequency according to a first embodiment of the present invention.

With reference now to the drawings, and particularly to the first embodiment, there is illustrated in FIG. 1, a television transmission system which includes eight television cameras C1–C8 each of which is trained on a different scene. For the purpose of the present discussion, it will be assumed that these cameras are monochrome cameras; however those skilled in the art will appreciate that other means of providing video signals such as a plurality of video tape recorders may be used with equal success. The video output signals from the cameras C1–C4 are denoted as Y1–Y4, respectively, and the output signals from the cameras C5–C8 are denoted as I1–I4, respectively. Separate blanker circuits 10, 11, 12 and 13 receive the video signals Y1–Y4, respectively, and limit the video signal for display in a different one of the quadrants of the picture tube which is shown diagrammatically in FIG. 1. The resultant blanked signals are summed by an adder circuit 14 to produce a composite video signal $Y_S$ in line 15.

Blanker circuits 16, 17, 18 and 19 receive the video signals I1–I4 and limit the pictures represented thereby for display in a different one of the quadrants of the receiving tube which is illustrated diagrammatically in FIG. 1. The resultant blanked signals are then summed by an adder circuit 20 to produce a composite video signal $I_S$ in line 21. Each of the blanking circuits 10-13 and 16-19 are controlled in response to blanking pulses X1-X4 produced by a blanking generator 22 which receives a sync pulse from a sync generator 23. The sync pulses are also delivered by line 24 to each of the cameras C1-C8. In addition, the sync pulses in line 24 are connected to a sample pulse generator 25 having pulse transmission lines connected to gates G1-G10. Gates G1-G8 receive audio signals A1-A8 while gates G9 and G10 receiving coding signals S1-S2, respectively. The code signals S1 and S2 have essentially the same general characteristics as the audio signals. The code signals are used to perform audio and picture switching operations at the receiver in conjunction with student response. The gates G1–G10 are rendered conductive by successive control pulses from generator 25 producing a sampling of the signals A1–A8 and S1–S2 delivered to add circuit 26 which produces a composite summation signal $Q_S$ in line 27. The summation signals $Y_S$, $I_S$ and $Q_S$ are then connected to the inputs of a modified NTSC encoder.

Figure 2:
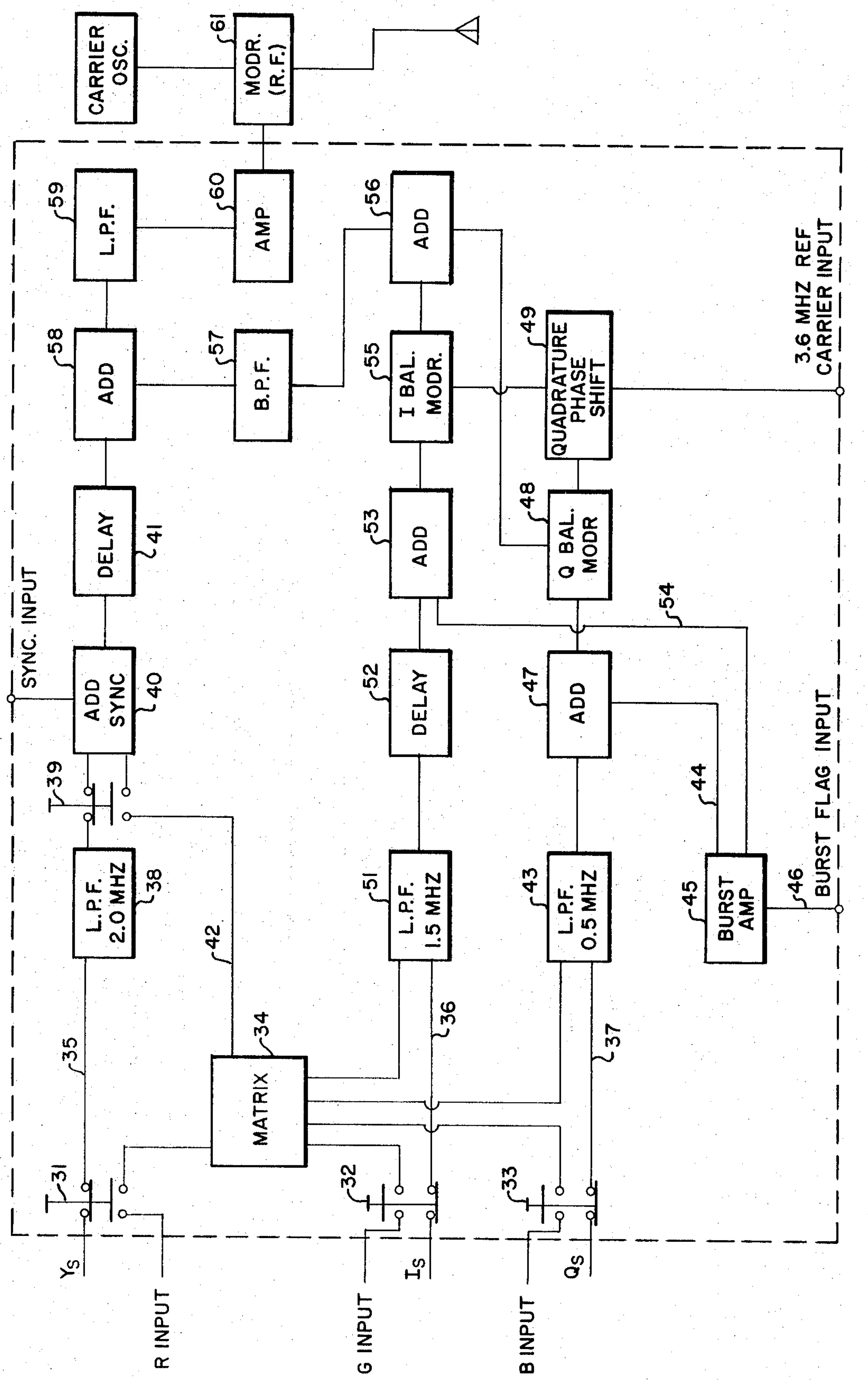
FIG. 2 is a block diagram of a modified encoder for the circuit illustrated in FIG. 1.

FIG. 2 is a schematic illustration of such an encoder wherein the $Y_S$, $I_S$ and $Q_S$ signals are delivered through switches 31, 32 and 33 which, upon actuation thereof, these switches deliver alternatively a red input video signal, a green input video signal and a blue input video signal from a color television camera to the matrix circuit 34. These switches when in their position shown by FIG. 2 deliver the signals $Y_S$, $I_S$ and $Q_S$ to lines 35, 36 and 37, respectively. The $Y_S$ signal is bandwidth limited by a 2.0 megahertz low-pass filter 38, and then it passes through a switch 39, mechanically coupled to the switch 31, to a summation circuit 40 where a sync input signal is added with the $Y_S$ signal. The $Y_S$ signal is then delivered to a delay circuit 41. Should it be desired to employ the encoder illustrated in FIG. 2 in a conventional manner for color television transmission purposes, then the matrix circuitry 34 has an output signal Y in line 42 which passes through the switch 39 and into the summation circuit 40 from where it continues in the manner to be described hereinafter. Either the $Q_S$ or Q signal depending upon the position of the switch 33 is bandwidth limited by a 0.5 megahertz low-pass filter 43. A burst pulse is then added to the signal which, for the purpose of disclosing the present invention will be discussed in terms of the $Q_S$ signal. The burst pulse is added to the $Q_S$ signal during the time of the back porch of the video signal by introducing a pulse in line 44 which also receives a burst flag input from line 46. From the summation circuit 47, the Q signal is then fed to a Q balance modulator 48 which also receives the subcarrier signal from a quadrature phase shift circuit 49 having an input reference signal of approximately 3.6 megahertz.

The $I_S$ or I signal depending upon the position of switch 32 is delivered to a 1.5 megahertz low-pass filter 51. For the purpose of disclosing the present invention, it will be discussed in terms of the $I_S$ signal. The $I_S$ then passes from the filter 51 to a delay circuit 52 for synchronization with the $Q_S$ signal due to the time lag produced by the unequal bandwidths of the low-pass filters in the $Q_S$ and $I_S$ signal paths. The $I_S$ signal is then added in circuitry 53 to a pulse signal transmitted along line 54 from a burst pulse amplifier 45. The $I_S$ signal is then fed to an I balanced modulator 55 which also receives a subcarrier output signal from the quadrature phase circuit 49. The outputs from the I balanced modulator and the Q balance modulator are in the form of an amplitude modulated carrier signal having a quadrature phase relationship brought about the phase shift in the circuitry 49. These signals are then added together in summation circuitry 56 to form a single subcarrier signal which is then bandwidth limited by a band-pass filter 57 from where the signals are summed with the $Y_S$ signal in added circuitry 58. The composite signal of the $Y_S$, $I_S$ and $Q_S$ signals is then bandwidth limited by a low-pass filter 59 to conform to the NTSC specifications before being applied to an amplifier 60 and thence to a radio-frequency output circuit 61. It is important to note that due to the overlapping spectral response of the conventional Y, I and Q video signals, it is impossible to independently detect these signals in the receiver. To overcome this, the 2.0 megahertz low-pass filter 38 limits the response of the $Y_S$ signal to permit independent detection in the receiver in complete independence of the $I_S$ and $Q_S$ signals.

Figure 3:
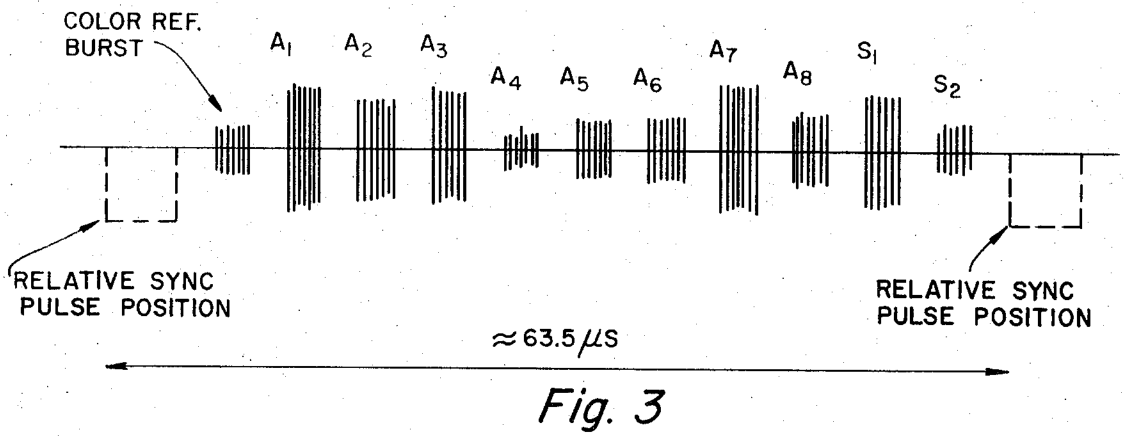
FIG. 3 is a waveform illustrating the audio signal modulations onto a Q channel subcarrier.

FIG. 3 illustrates a horizontal scan line for the Q subcarrier signals onto which there is modulated sampled audio signals A1–A8 followed by coding signals S1 and S2. The relative position of the modulated successive audio sample signals is clearly shown wherein they follow the color reference burst which is preceded by the horizontal sync pulse position. In the receiver, upon detection of the horizontal sync pulse followed by the color reference burst, the modulated audio signals are then demodulated using a local 3.6 megahertz reference signal. In this manner, the sampled audio signals are regained in the receiver following which they are connected to suitable switching for the selection of one of the signals which is then connected to an audio amplifying system in any one of a number of well-known manners.

Figure 4:
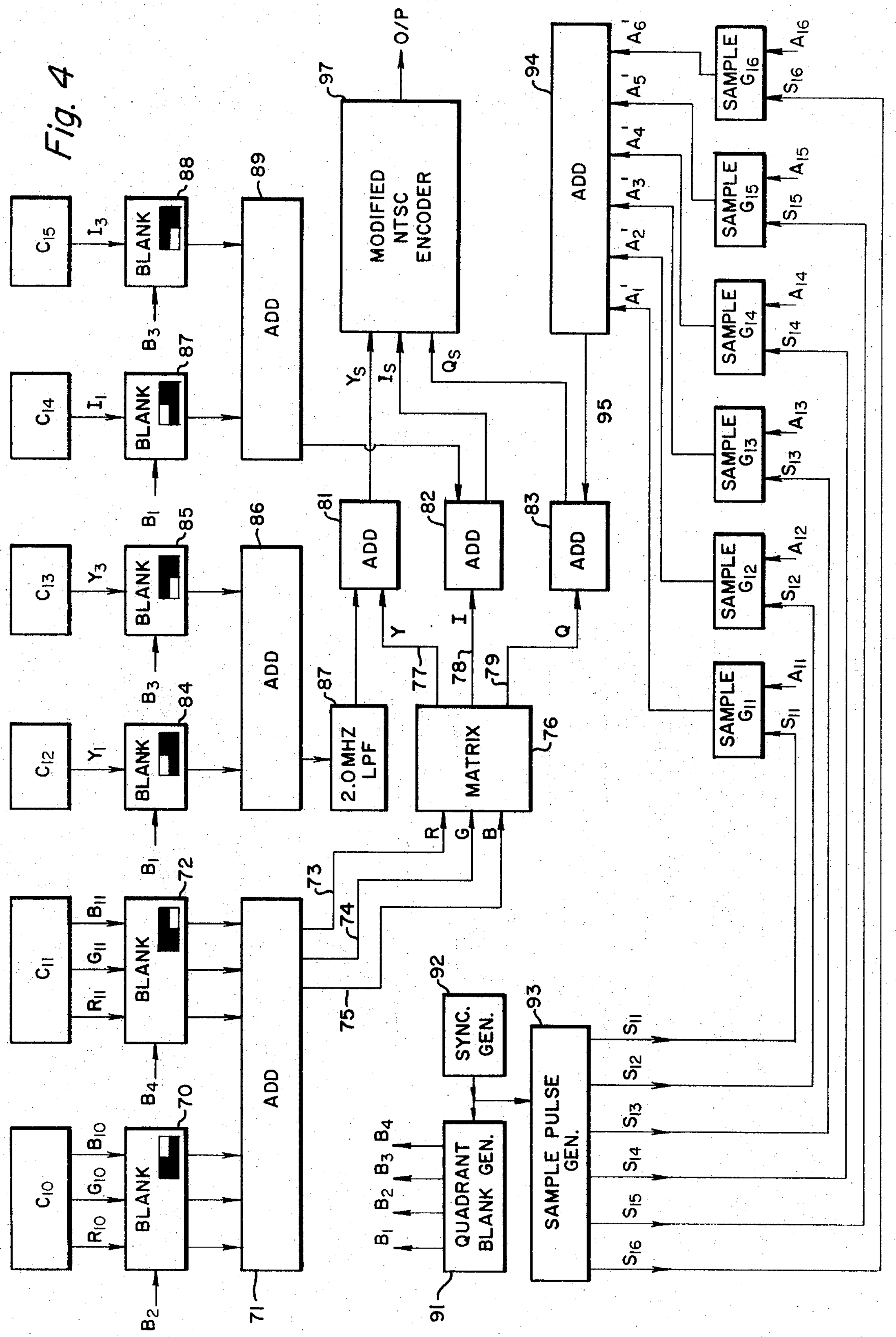
FIG. 4 is a block diagram of a second embodiment of the present invention wherein two color pictures and four monochrome pictures are transmitted along with a plurality of audio signals using a single television carrier frequency.

In accordance with the second embodiment of the present invention, there is provided a transmission system for a plurality of video signals corresponding to the output from two color cameras and four monochrome cameras. This embodiment of the invention is illustrated in FIG. 4 wherein C10 and C11 are color cameras and C12-C15 are monochrome cameras. The camera C10 has color video output signals R10, G10 and B10 connected to a blanker circuit 70 which limits the video signals to the upper right-hand quadrant of the camera field, which is illustrated digrammatically in FIG. 4. After blanking, the signals from camera C10 are connected to an adder circuit 71. The camera C11 has color output signals R11, G11 and B11 connected to a blanker circuit 72 which limits the video signals to color information for display in the lower right-hand quadrant of the camera field which is illustrated diagrammatically in FIG. 4. The color video signals delivered from the blanker 72 are connected to the adder circuit 71 where they are combined with the color video signals from camera C10. In other words, the video signals R10 and R11 are combined, the video signals G10 and G11 are combined, and the video signals B10 and B11 are combined. From the adder, the combined video signals R, G and B are delivered by lines 73, 74 and 75, respectively, to a matrix circuit 76 which functions in the conventional manner to produce a Y signal in line 77, an I signal in line 78 and a Q signal in line 79. These Y, I and Q signals are connected to adder circuits 81, 82 and 83, respectively.

Returning now to the monochrome cameras C12 and C13, their output signals Y1 and Y3 are connected to blanker circuits 84 and 85, respectively, which limit the pictures to a field of view corresponding to the upper and lower left-hand quadrants which is illustrated diagrammatically in FIG. 4. The resultant signals Y1 and Y3 are added in circuitry 86 to form a $Y_S$ composite signal which is delivered to a 2.0 megahertz filter 87 for limiting the bandwidth of the $Y_S$ signal in a manner already described with respect to FIG. 2. The signal from the filter 87 is connected to the adding circuit 81.

The monochrome cameras C14 and C15 have video output signals I1 and I3 which are connected to blanker circuits 87 and 88, respectively, that limit the video signals for display in the upper and lower left-hand quadrants which is illustrated diagrammatically in FIG. 4. The output signals from the blanker circuit are added together in circuitry 89 to provide a composite signal $I_S$ which is connected to the adder circuit 82. The blankers 70, 72, 84, 85, 87 and 88 are operated in response to blanking pulses B1, B2, B3 and B4 from a quadrant blank generator 91 which is controlled in response to pulses produced by a sync generator 92. Pulses B2 and B4 control blankers 70 and 72, respectively. Pulse B1 controls blankers 84 and 87. Pulse B3 controls blankers 85 and 88. The sync pulses from generator 92 are also delivered to a sample pulse generator 93 that produces six pulses S11-S16 which are connected to gates G11–G16, respectively. When these gates are rendered conductive by these pulses, audio signals A11–A16 are sampled and delivered to adder circuit 94 that produces a composite signal in line 95 which is connected to the adder 83. This circuit produces a time shared $Q_S$ signal made up of audio and video signals which are connected to an encoder 97 where the $Q_S$ is modulated onto a subcarrier signal for transmission on a single television carrier signal.

Figure 5:
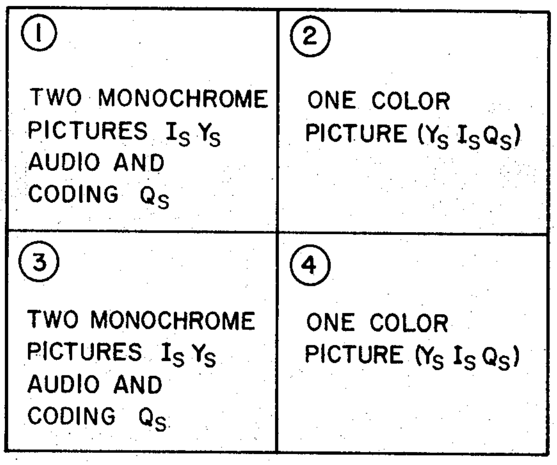
FIG. 5 illustrates the quadrants of a receiving tube wherein pictures are displayed according to the present invention.
Figure 6:
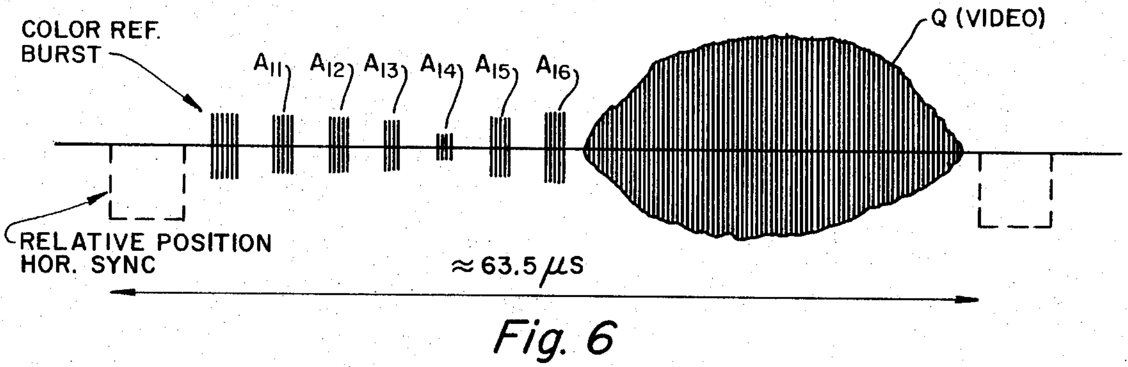
FIG. 6 is a video waveform of the Q subcarrier signal illustrating the modulation of audio signals onto this subcarrier signal which is also used to carry Q color video signals in a time shared manner.

From the adder 82, a composite $I_S$ signal is formed which is connected to the encoder 97 which modulated onto a subcarrier in a quadrature phase relation to the $Q_S$ signal. From the adder 81, the $Y_S$ is delivered to the encoder 97 where it is combined with the modulated $I_S$ and $Q_S$ signals to form a carrier signal in a manner previously described with respect to FIG. 2. The relative position of the Q video signal and the audio signals A11-A16 as they are modulated onto the 3.6 subcarrier signal is shown in FIG. 6. In this figure, there is illustrated one horizontal line during the scanning of the field by the cameras. During this scan line, the horizontal sync is followed by a color reference burst. The audio signals A11–A16 then follow time shared on this line with the Q video signal. It will be observed that the signals A11–A16 are modulated onto the subcarrier signal during approximately one-half of the scan line and that the remaining time is used for transmission of the Q video signal. This time sharing of the Q video channel for audio and video transmission purposes makes possible many combinations when a quadrant arrangement is used for monochrome pictures and color pictures. One such arrangement is illustrated in FIG. 5 where monochrome pictures are displayed in the quadrants at the left-hand side of the field by using the $Y_S$ and $I_S$ channels for video transmission purposes and the $Q_S$ for audio and coding. The right-hand quadrants in the picture field use the $Y_S$, $I_S$ and $Q_S$ signals for video transmission purposes in order to provide color programming for these quadrants. Since the audio signals are sampled during every line period, an audio bandwidth of approximately 8 kilohertz is obtainable. Due to this relatively long period of time, approximately 25 microseconds, during which the audio signals can be inserted into the subcarrier signal, separation and recovery of the signals at a receiver is somewhat simplified.

Since sampling of audio signals occurs once every horizontal period, the audio bandwidths available as described would be 8 kilohertz on both embodiments. However, since there is plenty of time available during the horizontal scan period, it would be possible to sample all or some of the audio signals more than once. This would permit increased audio bandwidth. For instance, if one of the audio signals were sampled twice during one horizontal scan period, it would be possible to obtain 16 kilohertz of audio bandwidth. Such increased bandwidth would be advantageous for higher quality speech or music if this were desired.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. An apparatus for transmitting a plurality of separate pictures or scenes and a plurality of audio signals using modulated subcarriers on a single TV carrier signal such that at least two scenes are transmitted for display in certain of four quadrants of a television receiving tube, the combination comprising:

means for producing a plurality of video signals corresponding to said separate scenes, blanker means for limiting the scenes represented by said video signals for display in a predetermined quadrant of a television receiving tube, means for producing at least two video summation signals, each comprising at least two of said blanked video signals, means for sampling a plurality of audio signals to provide a plurality of audio signal bursts, means for producing an audio summation signal from said audio signal bursts; and encoder means receiving said two video summation signals and said audio summation signal for modulating one of said video summation signals and said audio summation signal onto separate phase displaced subcarriers for transmission with the other of said video summation signals on a single television carrier signal.

2. An apparatus according to claim 1 wherein said means for sampling a plurality of audio signals includes gate means for sampling each of said plurality of audio signals, and a sample pulse generator for rendering conductive each of said gate means.

3. An apparatus according to claim 2 further comprising means for producing sync pulse to control said blanker means and control said sample pulse generator.

4. An apparatus according to claim 3 wherein said means for producing sync pulse provides sync control for said means for producing said plurality of video signals.

5. An apparatus according to claim 2 wherein said plurality of video signals comprise eight monochrome video signals, and said two video summation signals each comprise four blanked video signals that are arranged for display in the respective four quadrants of a receiving tube.

6. An apparatus according to claim 5 wherein said means for sampling a plurality of audio signals includes eight gate means for providing sampled audio signals and a sample pulse generator for rendering conductive each of said gate means during each horizontal scan line of a video picture.

7. An apparatus according to claim 6 further comprising a plurality of gate means for providing a plurality of sampled coding signals, said sample pulse generator rendering conductive said plurality of gate means for coding signals during each horizontal scan line of a video picture and said audio summation signal comprising a summation signal made up of the sampled audio signals from said eight gate means and the sampled coding signals of said plurality of gate means.

8. An apparatus according to claim 1 wherein said plurality of video signals comprise color video signals for two scenes and monochrome video signals for at least two scenes, whereby said video summation signals comprise a summation video signal of said color video signals from said blanker means and a summation video signal of said monochrome video signals from said blanker means.

9. An apparatus according to claim 8 wherein said plurality of video signals further comprise monochrome video signals of four scenes whereby said video susmmation signals include two summation video signals of said monochrome signals from said blanker means.

10. An apparatus according to claim 9 wherein said means for sampling a plurality of audio signals comprise six gate means for providing sampled audio signals and a sample pulse generator for rendering conductive each of said gate means during each horizontal scan line when providing blanked monochrome video signals.

11. An apparatus for transmitting a plurality of separate pictures or scenes and a plurality of audio signals as modulated subcarriers on a single TV radio frequency carrier signal to provide two scenes for display in each of four quadrants of a television receiving tube, the combination comprising:

means for producing eight video signals corresponding to a different scene;

blanker means for each of said eight video signals to limit the scene for display in one of said quadrants;

adding means receiving the blanked video signals forming a $Y_S$ and $I_S$ summation video signal corresponding to two scenes for display in each of four quadrants;

gate means for sampling each of a plurality of audio signals, sample pulse generator means for rendering conductive said gate means during each horizontal video scan line, adding means forming a $Q_S$ summation audio signal from the sampled plurality of audio signals; and encoder means for modulating said $I_S$ summation video signal and said $Q_S$ summation audio signal onto a subcarrier in a quadrature phase relation for transmission of said $I_S$ and $Q_S$ signals with said $Y_S$ signal on a single RF carrier signal.

12. An apparatus according to claim 11 wherein said encoder means includes a 2.0 megahertz filter means in the signal path of said $Y_S$ summation video signal.

13. An apparatus for transmitting a plurality of separate pictures or scenes and a plurality of audio signals as modulated subcarriers on a single TV radio frequency carrier signal to provide a display in the four quadrants of the receiving tube consisting of color scenes in two of the four quadrants and four monochrome scenes for selective display in the remaining two of the four quadrants, said apparatus comprising:

means for producing video signals corresponding to six different scenes of which two of the scenes are represented by color video signals;

blanker means for said video signals to limit the scene represented thereby for display in selected ones of said quadrants;

first adding means receiving the blanked color video signals for producing Red, Green and Blue combined video signals;

matrixing means for producing Y, I and Q video signals from said combined video signals;

second adding means for producing a $Y_S$ composite video signal from two of the said monochrome video signals;

third adding means for producing an $I_S$ composite video signal from the remaining two of the said monochrome video signals;

gate means for sampling each of a plurality of audio signals, sample pulse generator means for rendering conductive said gate means during each horizontal video scan line when said $Y_S$ and $I_S$ composite video signals are formed;

fourth adding means for producing a composite audio signal from the sampled audio signals; and encoder means for modulating said I and $I_S$ signals and said Q and $Q_S$ signals onto a subcarrier in a quadrature phase relation for transmission with said Y and $Y_S$ signals on a single radio frequency carrier signal.

14. An apparatus according to claim 13 further comprising:

means for summing said I and $I_S$ signals for delivery to said encoder means, means for summing said Q and $Q_S$ signals for delivery to said encoder means, and means for summing said Y and $Y_S$ signals for delivery to said encoder means.

15. An apparatus according to claim 14 further comprising a 2.0 megahertz filter means in the signal path of said $Y_S$ video signal preceding said means for summing said Y and $Y_S$ signals.

* * * * *